US012729259B2

(12) United States Patent
Yamamoto et al.

(10) Patent No.: US 12,729,259 B2
(45) Date of Patent: Sep. 8, 2026

(54) COPOLYMER, INJECTION MOLDED BODY, MEMBER TO BE COMPRESSED, AND COATED WIRE

(71) Applicant: DAIKIN INDUSTRIES, LTD., Osaka (JP)

(72) Inventors: Yukari Yamamoto, Osaka (JP); Tadaharu Isaka, Osaka (JP); Yumi Zenke, Osaka (JP); Hayato Tsuda, Osaka (JP); Keizou Shiotsuki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 516 days.

(21) Appl. No.: 18/192,101

(22) Filed: Mar. 29, 2023

(65) Prior Publication Data

US 2023/0227594 A1 Jul. 20, 2023

Related U.S. Application Data

(63) Continuation of application No. PCT/JP2021/036305, filed on Sep. 30, 2021.

(30) Foreign Application Priority Data

Sep. 30, 2020 (JP) ................................ 2020-166527

(51) Int. Cl.

*C09D 127/18* (2006.01)
*C08F 214/26* (2006.01)
*H01B 3/44* (2006.01)
*H01B 7/02* (2006.01)

(52) U.S. Cl.

CPC ......... *C08F 214/267* (2013.01); *H01B 3/445* (2013.01); *H01B 7/02* (2013.01)

(58) Field of Classification Search

None

See application file for complete search history.

(56) References Cited

U.S. PATENT DOCUMENTS

| | | | |
|---|---|---|---|
| 3,635,926 | A | 1/1972 | Gresham et al. |
| 3,945,786 | A | 3/1976 | Bishop |
| 4,029,868 | A | 6/1977 | Carlson |
| 4,262,101 | A | 4/1981 | Hartwimmer et al. |
| 4,414,356 | A | 11/1983 | Michel |
| 4,510,300 | A | 4/1985 | Levy |
| 4,743,658 | A | 5/1988 | Imbalzano et al. |
| 4,902,444 | A | 2/1990 | Kolouch |
| 5,000,875 | A | 3/1991 | Kolouch |
| 5,656,392 | A | 8/1997 | Sano et al. |
| 5,703,185 | A | 12/1997 | Blair |
| 5,767,198 | A | 6/1998 | Shimizu et al. |
| 5,851,693 | A | 12/1998 | Sano et al. |
| 6,066,707 | A | 5/2000 | Colaianna et al. |
| 6,069,215 | A | 5/2000 | Araki et al. |
| 6,096,795 | A | 8/2000 | Abusleme et al. |
| 6,689,833 | B1 | 2/2004 | Bidstrup et al. |
| 6,713,183 | B2 | 3/2004 | Araki et al. |
| 6,740,375 | B1 | 5/2004 | Sagisaka et al. |
| 6,774,196 | B1 | 8/2004 | Taira et al. |
| 8,143,351 | B2 | 3/2012 | Shiotsuki et al. |
| 11,826,975 | B2 | 11/2023 | Imamura et al. |
| 2002/0011692 | A1 | 1/2002 | Lahijani |
| 2002/0099143 | A1 | 7/2002 | Namura |
| 2002/0167115 | A1 | 11/2002 | Tanaka |
| 2003/0013791 | A1 | 1/2003 | Blong et al. |
| 2003/0109646 | A1 | 6/2003 | Kubo et al. |
| 2003/0114615 | A1 | 6/2003 | Sumi et al. |
| 2003/0190530 | A1 | 10/2003 | Yang et al. |
| 2003/0216531 | A1 | 11/2003 | Aten et al. |
| 2004/0072935 | A1 | 4/2004 | Blong et al. |
| 2004/0102572 | A1 | 5/2004 | Kubo et al. |
| 2004/0204536 | A1 | 10/2004 | Miyatani et al. |
| 2004/0260044 | A1 | 12/2004 | Earnest, Jr. et al. |
| 2005/0020792 | A1 | 1/2005 | Aoyama et al. |
| 2005/0245626 | A1 | 11/2005 | Hoaglund et al. |
| 2007/0112155 | A1 | 5/2007 | Takase et al. |
| 2007/0149734 | A1 | 6/2007 | Sakakibara et al. |
| 2007/0281166 | A1 | 12/2007 | Nishio |

(Continued)

FOREIGN PATENT DOCUMENTS

| | | | |
|---|---|---|---|
| CN | 1527852 | A | 9/2004 |
| CN | 1599757 | A | 3/2005 |

(Continued)

OTHER PUBLICATIONS

International Preliminary Report on Patentability, with Translation of Written Opinion issued Mar. 28, 2023 in International Application No. PCT/JP2021/036301.

International Preliminary Report on Patentability, with Translation of Written Opinion issued Mar. 28, 2023 in International Application No. PCT/JP2021/036302.

International Preliminary Report on Patentability, with Translation of Written Opinion issued Mar. 28, 2023 in International Application No. PCT/JP2021/036303.

International Preliminary Report on Patentability, with Translation of Written Opinion issued Mar. 28, 2023 in International Application No. PCT/JP2021/036304.

International Preliminary Report on Patentability, with Translation of Written Opinion issued Mar. 28, 2023 in International Application No. PCT/JP2021/036305.

International Preliminary Report on Patentability, with Translation of Written Opinion issued Mar. 28, 2023 in International Application No. PCT/JP2021/036306.

(Continued)

*Primary Examiner* — Catherine S Branch

(74) *Attorney, Agent, or Firm* — Sughrue Mion, PLLC

(57) ABSTRACT

A copolymer containing tetrafluoroethylene unit and a perfluoro(propyl vinyl ether) unit, wherein the copolymer has a content of the perfluoro(propyl vinyl ether) unit of 5.8 to 7.6% by mass with respect to the whole of the monomer units, a melt flow rate of 50 to 68 g/10 min, and the number of functional groups of $—CF=CF_2$, $—CF_2H$, —COF, —COOH, $—COOCH_3$, $—CONH_2$ and $—CH_2OH$ of 50 or less per $10^6$ main-chain carbon atoms. Also disclosed is an injection molded article and member to be compressed containing the copolymer, and a coated electric wire including a coating layer containing the copolymer.

4 Claims, No Drawings

(56) References Cited

U.S. PATENT DOCUMENTS

2007/0292685 A1 12/2007 Brothers et al.
2008/0038627 A1 2/2008 Yamauchi et al.
2008/0114143 A1 5/2008 Brothers et al.
2008/0241534 A1 10/2008 Ohtani et al.
2009/0038821 A1 2/2009 Sato et al.
2009/0044965 A1 2/2009 Kono et al.
2009/0176952 A1 7/2009 Funaki et al.
2009/0246435 A1 10/2009 Shimono et al.
2010/0063214 A1 3/2010 Kasahara et al.
2010/0212929 A1 8/2010 Ishii et al.
2010/0273047 A1 10/2010 Kunoike et al.
2010/0314153 A1 12/2010 Ishii et al.
2010/0314154 A1 12/2010 Kitahara et al.
2011/0052970 A1 3/2011 Kurata et al.
2011/0052977 A1 3/2011 Kurata et al.
2011/0104562 A1 5/2011 Byun et al.
2011/0203830 A1 8/2011 Kono et al.
2011/0272173 A1 11/2011 Shiotsuki et al.
2012/0035329 A1 2/2012 Isogai et al.
2012/0064273 A1 3/2012 Bacino
2012/0094169 A1 4/2012 Kim et al.
2013/0046058 A1 2/2013 Pham et al.
2013/0130100 A1 5/2013 Kurata et al.
2014/0227533 A1 8/2014 Murakami et al.
2014/0287177 A1 9/2014 Suda et al.
2014/0378616 A1 12/2014 Nakano et al.
2015/0041145 A1 2/2015 Colaianna et al.
2015/0148481 A1 5/2015 Brothers et al.
2015/0158988 A1 6/2015 Sawaki et al.
2015/0353700 A1 12/2015 Isaka et al.
2016/0006004 A1 1/2016 Ogawa et al.
2016/0078979 A1 3/2016 Hosoda et al.
2016/0108159 A1 4/2016 Sekiguchi et al.
2016/0194491 A1 7/2016 Taguchi et al.
2016/0272805 A1 9/2016 Nakanishi et al.
2016/0319089 A1 11/2016 Imamura et al.
2016/0322128 A1 11/2016 Imamura et al.
2016/0340455 A1 11/2016 Abe et al.
2017/0008986 A1 1/2017 Isaka et al.
2017/0025204 A1 1/2017 Chapman et al.
2017/0154707 A1 6/2017 Abe et al.
2017/0214037 A1 7/2017 Uematsu et al.
2017/0260344 A1 9/2017 Imamura et al.
2018/0009204 A1 1/2018 Higuchi et al.
2018/0036931 A1 2/2018 Higuchi et al.
2018/0237566 A1 8/2018 Aida et al.
2018/0265654 A1 9/2018 Imamura et al.
2018/0283590 A1 10/2018 Yokoyama et al.
2019/0134939 A1 5/2019 Colaianna et al.
2019/0143628 A1 5/2019 Colaianna et al.
2019/0177453 A1 6/2019 Isaka et al.
2019/0193315 A1 6/2019 Miyamoto et al.
2019/0375929 A1 12/2019 Nishimura et al.
2019/0382544 A1 12/2019 Yokotani et al.
2020/0332037 A1 10/2020 Isaka et al.
2021/0008827 A1 1/2021 Colaianna et al.
2021/0008828 A1 1/2021 Colaianna et al.
2021/0024709 A1 1/2021 Fukushima et al.
2021/0024769 A1 1/2021 Imamura et al.
2021/0189031 A1 6/2021 Hintzer et al.
2021/0246237 A1 8/2021 Isaka et al.
2021/0269568 A1 9/2021 Imamura et al.
2022/0001657 A1 1/2022 Kikuchi et al.
2022/0033636 A1 2/2022 Nishimura et al.
2022/0170573 A1 6/2022 Imamura et al.
2022/0181689 A1 6/2022 Isaka et al.
2022/0181698 A1 6/2022 Isaka et al.
2022/0181729 A1 6/2022 Isaka et al.
2022/0195088 A1 6/2022 Imamura et al.
2022/0213996 A1 7/2022 Imamura et al.
2022/0266485 A1 8/2022 Tsuda et al.
2022/0278403 A1 9/2022 Tsuda et al.
2023/0235107 A1 7/2023 Isaka et al.
2023/0235159 A1 7/2023 Isaka et al.
2023/0235160 A1 7/2023 Isaka et al.
2023/0238627 A1 7/2023 Isaka et al.
2023/0238628 A1 7/2023 Zenke et al.
2023/0238629 A1 7/2023 Isaka et al.
2023/0272136 A1 8/2023 Zenke et al.
2023/0295356 A1 9/2023 Isaka et al.
2023/0344077 A1 10/2023 Qiu et al.
2023/0383031 A1 11/2023 Isaka et al.
2023/0383032 A1 11/2023 Isaka et al.
2023/0383033 A1 11/2023 Zenke et al.
2023/0383034 A1 11/2023 Isaka et al.
2023/0390977 A1 12/2023 Hamada et al.
2023/0390978 A1 12/2023 Tsuda et al.
2023/0390979 A1 12/2023 Tsuda et al.
2023/0390980 A1 12/2023 Tsuda et al.
2023/0390981 A1 12/2023 Tsuda et al.
2023/0391909 A1 12/2023 Isaka et al.
2023/0391910 A1 12/2023 Isaka et al.
2023/0391911 A1 12/2023 Isaka et al.
2023/0391912 A1 12/2023 Isaka et al.
2023/0391917 A1 12/2023 Isaka et al.
2023/0391920 A1 12/2023 Isaka et al.
2023/0391927 A1 12/2023 Isaka
2023/0391929 A1 12/2023 Isaka et al.
2023/0391931 A1 12/2023 Isaka et al.
2023/0391932 A1 12/2023 Isaka et al.
2023/0391933 A1 12/2023 Isaka et al.
2023/0392737 A1 12/2023 Tsuda et al.
2023/0395282 A1 12/2023 Isaka et al.
2023/0399431 A1 12/2023 Isaka et al.
2023/0399432 A1 12/2023 Isaka et al.
2023/0399438 A1 12/2023 Isaka et al.
2023/0399441 A1 12/2023 Isaka et al.
2023/0399443 A1 12/2023 Isaka et al.
2023/0406975 A1 12/2023 Isaka et al.
2023/0406976 A1 12/2023 Isaka et al.
2023/0411751 A1 12/2023 Tsuda et al.
2023/0415387 A1 12/2023 Hamada et al.
2025/0002728 A1 1/2025 Zenke et al.
2025/0011488 A1 1/2025 Isaka et al.
2025/0011490 A1 1/2025 Isaka et al.
2025/0011494 A1 1/2025 Isaka et al.
2025/0011496 A1 1/2025 Yamamoto et al.
2025/0011498 A1 1/2025 Isaka et al.
2025/0011499 A1 1/2025 Isaka et al.
2025/0011500 A1 1/2025 Isaka et al.
2025/0019476 A1 1/2025 Isaka et al.
2025/0034302 A1 1/2025 Isaka et al.

FOREIGN PATENT DOCUMENTS

CN 101364456 A 2/2009
CN 103946250 A 7/2014
CN 107428144 A 12/2017
CN 109476061 3/2019
CN 110712348 A 1/2020
CN 110790854 A 2/2020
CN 114223086 A 3/2022
CN 114258609 A 3/2022
CN 116390957 A 7/2023
CN 116867821 A 10/2023
CN 116917346 A 10/2023
EP 0 220 910 A2 5/1987
EP 0 423 995 A1 4/1991
EP 0 976 544 A1 2/2000
EP 1 260 526 A1 11/2002
EP 1 462 458 A1 9/2004
EP 3 816 214 A1 5/2021
EP 4 024 550 A1 7/2022
EP 4 024 575 A1 7/2022
EP 4 223 793 A1 8/2023
EP 4 223 794 A1 8/2023
GB 1210794 A 10/1970
JP 48-20788 B1 6/1973
JP 58-132512 A 8/1983
JP 58-191127 A 11/1983
JP 59-120433 A 7/1984
JP 62-104822 A 5/1987
JP 62-53019 B2 11/1987
JP 1-53167 B2 11/1989

(56) References Cited

FOREIGN PATENT DOCUMENTS

| | | | |
|---|---|---|---|
| JP | 2-129253 | A | 5/1990 |
| JP | 3-184209 | A | 8/1991 |
| JP | 3-247609 | A | 11/1991 |
| JP | 4-357398 | A | 12/1992 |
| JP | 6-1902 | A | 1/1994 |
| JP | 6-40813 | B2 | 6/1994 |
| JP | 6-287405 | A | 10/1994 |
| JP | 7-16869 | A | 1/1995 |
| JP | 7-112449 | A | 5/1995 |
| JP | 7-188337 | A | 7/1995 |
| JP | 7-290496 | A | 11/1995 |
| JP | 8-207106 | A | 8/1996 |
| JP | 8-321287 | A | 12/1996 |
| JP | 9-245832 | A | 9/1997 |
| JP | 10-87746 | A | 4/1998 |
| JP | 10-158456 | A | 6/1998 |
| JP | 10-275604 | A | 10/1998 |
| JP | 10-292054 | A | 11/1998 |
| JP | 2001-151825 | A | 6/2001 |
| JP | 2001-151826 | A | 6/2001 |
| JP | 2001-283907 | A | 10/2001 |
| JP | 2001-283921 | A | 10/2001 |
| JP | 2002-53620 | A | 2/2002 |
| JP | 2002-63934 | A | 2/2002 |
| JP | 2002-167488 | A | 6/2002 |
| JP | 2003-327770 | A | 11/2003 |
| JP | 2003-534940 | A | 11/2003 |
| JP | 2004-256406 | A | 9/2004 |
| JP | 2004-534131 | A | 11/2004 |
| JP | 2005-523979 | A | 8/2005 |
| JP | 2005-298659 | A | 10/2005 |
| JP | 2005-320497 | A | 11/2005 |
| JP | 2006-117912 | A | 5/2006 |
| JP | 2006-312736 | A | 11/2006 |
| JP | 2007-238960 | A | 9/2007 |
| JP | 2008-66254 | A | 3/2008 |
| JP | 2009-42478 | A | 2/2009 |
| JP | 2009-59690 | A | 3/2009 |
| JP | 2009-235564 | A | 10/2009 |
| JP | 2009-272207 | A | 11/2009 |
| JP | 2010-56079 | A | 3/2010 |
| JP | 2010-509443 | A | 3/2010 |
| JP | 2010-85741 | A | 4/2010 |
| JP | 2010-162817 | A | 7/2010 |
| JP | 2010-235667 | A | 10/2010 |
| JP | 2011-48976 | A | 3/2011 |
| JP | 2011-71104 | A | 4/2011 |
| JP | 2012-54269 | A | 3/2012 |
| JP | 2012-80911 | A | 4/2012 |
| JP | 2012-106494 | A | 6/2012 |
| JP | 2012-130557 | A | 7/2012 |
| JP | 2013-71341 | A | 4/2013 |
| JP | 2013-82888 | A | 5/2013 |
| JP | 2013-177574 | A | 9/2013 |
| JP | 2014-28951 | A | 2/2014 |
| JP | 2014-59052 | A | 4/2014 |
| JP | 2014-187040 | A | 10/2014 |
| JP | 2015-7218 | A | 1/2015 |
| JP | 2015-519410 | A | 7/2015 |
| JP | 2015-147924 | A | 8/2015 |
| JP | 2015-168840 | A | 9/2015 |
| JP | 2016-537499 | A | 12/2016 |
| JP | 2017-197690 | A | 11/2017 |
| JP | 2018-20468 | A | 2/2018 |
| JP | 2018-514598 | A | 6/2018 |
| JP | 2018-523272 | A | 8/2018 |
| JP | 2018-159090 | A | 10/2018 |
| JP | 2019-172962 | A | 10/2019 |
| JP | 2019-210420 | A | 12/2019 |
| JP | 2019-214641 | A | 12/2019 |
| JP | 2020-2341 | A | 1/2020 |
| JP | 2020-15906 | A | 1/2020 |
| JP | 2020-29042 | A | 2/2020 |
| JP | 2020-100823 | A | 7/2020 |
| JP | 2020-100843 | A | 7/2020 |
| JP | 2021-6648 | A | 1/2021 |
| JP | 2021-141043 | A | 9/2021 |
| JP | 2021-141045 | A | 9/2021 |
| JP | 2022-19196 | A | 1/2022 |
| KR | 10-2004-0071160 | A | 8/2004 |
| KR | 10-2013-0069652 | A1 | 6/2013 |
| KR | 10-2019-0034205 | A | 4/2019 |
| WO | 95/29956 | A1 | 11/1995 |
| WO | 01/40331 | A1 | 6/2001 |
| WO | 03/006566 | A1 | 1/2003 |
| WO | 03/048214 | A1 | 6/2003 |
| WO | 2004/052987 | A1 | 6/2004 |
| WO | 2008/032613 | A1 | 3/2008 |
| WO | 2008/047759 | A1 | 4/2008 |
| WO | 2008/047906 | A1 | 4/2008 |
| WO | 2008/143069 | A1 | 11/2008 |
| WO | 2010/113864 | A1 | 10/2010 |
| WO | 2013/115374 | A1 | 8/2013 |
| WO | 2014/007346 | A1 | 1/2014 |
| WO | 2014/129413 | A1 | 8/2014 |
| WO | 2015/119053 | A1 | 8/2015 |
| WO | 2016/117492 | A1 | 7/2016 |
| WO | 2017/056203 | A1 | 4/2017 |
| WO | 2017/082417 | A1 | 5/2017 |
| WO | 2019/003265 | A1 | 1/2019 |
| WO | 2019/187725 | A1 | 10/2019 |
| WO | 2019/189316 | A1 | 10/2019 |
| WO | 2019/208492 | A1 | 10/2019 |
| WO | 2020/004083 | A1 | 1/2020 |
| WO | 2020/090981 | A1 | 5/2020 |
| WO | 2020/130144 | A1 | 6/2020 |
| WO | 2020/204163 | A1 | 10/2020 |
| WO | 2021/033539 | A1 | 2/2021 |
| WO | 2021/039862 | A1 | 3/2021 |
| WO | 2021/039863 | A1 | 3/2021 |
| WO | 2021/039865 | A1 | 3/2021 |
| WO | 2021039864 | A1 | 3/2021 |
| WO | 2021/059753 | A1 | 4/2021 |
| WO | 2022/181225 | A1 | 9/2022 |
| WO | 2022/181231 | A1 | 9/2022 |
| WO | 2022/181232 | A1 | 9/2022 |

OTHER PUBLICATIONS

International Preliminary Report on Patentability, with Translation of Written Opinion issued Mar. 28, 2023 in International Application No. PCT/JP2021/036307.

International Preliminary Report on Patentability, with Translation of Written Opinion issued Mar. 28, 2023 in International Application No. PCT/JP2021/036308.

International Preliminary Report on Patentability, with Translation of Written Opinion issued Mar. 28, 2023 in International Application No. PCT/JP2021/036309.

International Preliminary Report on Patentability, with Translation of Written Opinion issued Mar. 28, 2023 in International Application No. PCT/JP2021/036310.

European Search Report issued Feb. 10, 2025 for European Patent Application No. 22759283.9.

European Search Report issued Feb. 20, 2025 for European Patent Application No. 22759263.1.

Extended European Search Report issued Aug. 2, 2023 in European Application No. 20857704.9.

International Preliminary Report on Patentability dated Aug. 29, 2023 with a Translation of the Written Opinion of the International Searching Authority in Application No. PCT/JP2022/003634.

International Preliminary Report on Patentability dated Aug. 29, 2023 with a Translation of the Written Opinion of the International Searching Authority in Application No. PCT/JP2022/003635.

International Preliminary Report on Patentability dated Aug. 29, 2023 with a Translation of the Written Opinion of the International Searching Authority in Application No. PCT/JP2022/003636.

International Preliminary Report on Patentability dated Aug. 29, 2023 with a Translation of the Written Opinion of the International Searching Authority in Application No. PCT/JP2022/003637.

International Preliminary Report on Patentability dated Aug. 29, 2023 with a Translation of the Written Opinion of the International Searching Authority in Application No. PCT/JP2022/003638.

(56) References Cited

OTHER PUBLICATIONS

International Preliminary Report on Patentability dated Aug. 29, 2023 with a Translation of the Written Opinion of the International Searching Authority in Application No. PCT/JP2022/003640.
International Preliminary Report on Patentability dated Aug. 29, 2023 with a Translation of the Written Opinion of the International Searching Authority in Application No. PCT/JP2022/003641.
International Preliminary Report on Patentability dated Aug. 29, 2023 with a Translation of the Written Opinion of the International Searching Authority in Application No. PCT/JP2022/003642.
International Preliminary Report on Patentability dated Aug. 29, 2023 with a Translation of the Written Opinion of the International Searching Authority in Application No. PCT/JP2022/003643.
International Preliminary Report on Patentability dated Aug. 29, 2023 with a Translation of the Written Opinion of the International Searching Authority in Application No. PCT/JP2022/003644.
International Preliminary Report on Patentability dated Aug. 29, 2023 with a Translation of the Written Opinion of the International Searching Authority in Application No. PCT/JP2022/003645.
International Preliminary Report on Patentability dated Aug. 29, 2023 with a Translation of the Written Opinion of the International Searching Authority in Application No. PCT/JP2022/003646.
International Preliminary Report on Patentability dated Aug. 29, 2023 with a Translation of the Written Opinion of the International Searching Authority in Application No. PCT/JP2022/003647.
International Preliminary Report on Patentability dated Aug. 29, 2023 with a Translation of the Written Opinion of the International Searching Authority in Application No. PCT/JP2022/003648.
International Preliminary Report on Patentability dated Aug. 29, 2023 with a Translation of the Written Opinion of the International Searching Authority in Application No. PCT/JP2022/003649.
International Preliminary Report on Patentability dated Aug. 29, 2023 with a Translation of the Written Opinion of the International Searching Authority in Application No. PCT/JP2022/003650.
International Preliminary Report on Patentability dated Aug. 29, 2023 with a Translation of the Written Opinion of the International Searching Authority in Application No. PCT/JP2022/003651.
International Preliminary Report on Patentability dated Aug. 29, 2023 with a Translation of the Written Opinion of the International Searching Authority in Application No. PCT/JP2022/003652.
International Preliminary Report on Patentability dated Aug. 29, 2023 with a Translation of the Written Opinion of the International Searching Authority in Application No. PCT/JP2022/003653.
International Preliminary Report on Patentability dated Aug. 29, 2023 with a Translation of the Written Opinion of the International Searching Authority in Application No. PCT/JP2022/003654.
International Preliminary Report on Patentability dated Aug. 29, 2023 with a Translation of the Written Opinion of the International Searching Authority in Application No. PCT/JP2022/003657.
International Preliminary Report on Patentability dated Aug. 29, 2023 with a Translation of the Written Opinion of the International Searching Authority in Application No. PCT/JP2022/003658.
International Preliminary Report on Patentability dated Aug. 29, 2023 with a Translation of the Written Opinion of the International Searching Authority in Application No. PCT/JP2022/003659.
International Preliminary Report on Patentability dated Aug. 29, 2023 with a Translation of the Written Opinion of the International Searching Authority in Application No. PCT/JP2022/003660.
International Preliminary Report on Patentability dated Aug. 29, 2023 with a Translation of the Written Opinion of the International Searching Authority in Application No. PCT/JP2022/003661.
International Preliminary Report on Patentability dated Aug. 29, 2023 with a Translation of the Written Opinion of the International Searching Authority in Application No. PCT/JP2022/003664.
International Preliminary Report on Patentability dated Aug. 29, 2023 with a Translation of the Written Opinion of the International Searching Authority in Application No. PCT/JP2022/003665.
International Preliminary Report on Patentability dated Aug. 29, 2023 with a Translation of the Written Opinion of the International Searching Authority in Application No. PCT/JP2022/007735.
International Preliminary Report on Patentability dated Aug. 29, 2023 with a Translation of the Written Opinion of the International Searching Authority in Application No. PCT/JP2022/007737.
International Preliminary Report on Patentability dated Aug. 29, 2023 with a Translation of the Written Opinion of the International Searching Authority in Application No. PCT/JP2022/007738.
U.S. Appl. No. 17/679,789, filed Feb. 24, 2022, Isaka, et al., cont of PCT/JP2020/032238.
U.S. Appl. No. 17/679,831, filed Feb. 24, 2022, Isaka, et al., cont of PCT/JP2020/032239.
U.S. Appl. No. 17/679,818, filed Feb. 24, 2022, Isaka, et al., cont of PCT/JP2020/032236.
U.S. Appl. No. 17/679,765, filed Feb. 24, 2022, Isaka, et al., cont of PCT/JP2020/032237.
U.S. Appl. No. 17/680,911, filed Feb. 25, 2022, Tsuda, et al., cont of PCT/JP2020/032234.
U.S. Appl. No. 18/191,412, filed Mar. 28, 2023, Isaka, et al., cont of PCT/JP2021/036301.
U.S. Appl. No. 18/191,461, filed Mar. 28, 2023, Zenke, et al., cont of PCT/JP2021/036302.
U.S. Appl. No. 18/192,020, filed Mar. 29, 2023, Isaka, et al., cont of PCT/JP2021/036303.
U.S. Appl. No. 18/192,053, filed Mar. 29, 2023, Isaka, et al., cont of PCT/JP2021/036304.
U.S. Appl. No. 18/191,996, filed Mar. 29, 2023, Tsuda, et al., cont of PCT/JP2021/036306.
U.S. Appl. No. 18/192,052, filed Mar. 29, 2023, Zenke, et al., cont of PCT/JP2021/036307.
U.S. Appl. No. 18/192,011, filed Mar. 29, 2023, Isaka, et al., cont of PCT/JP2021/036308.
U.S. Appl. No. 18/192,077, filed Mar. 29, 2023, Isaka, et al., cont of PCT/JP2021/036309.
U.S. Appl. No. 18/192,298, filed Mar. 29, 2023, Isaka, et al., cont of PCT/JP2021/036310.
U.S. Appl. No. 18/453,775, filed Aug. 22, 2023, Tsuda, et al., cont of PCT/JP2022/007735.
U.S. Appl. No. 18/453,690, filed Aug. 22, 2023, Tsuda, et al., cont of PCT/JP2022/007737.
U.S. Appl. No. 18/452,806, filed Aug. 21, 2023, Tsuda, et al., cont of PCT/JP2022/007738.
U.S. Appl. No. 18/450,642, filed Aug. 16, 2023, Isaka, et al., cont of PCT/JP2022/003634.
U.S. Appl. No. 18/448,291, filed Aug. 11, 2023, Isaka, et al., cont of PCT/JP2022/003635.
U.S. Appl. No. 18/449,061, filed Aug. 14, 2023, Isaka, et al., cont of PCT/JP2022/003636.
U.S. Appl. No. 18/448,234, filed Aug. 11, 2023, Isaka, et al., cont of PCT/JP2022/003637.
U.S. Appl. No. 18/453,363, filed Aug. 22, 2023, Isaka, et al., cont of PCT/JP2022/003638.
U.S. Appl. No. 18/449,788, filed Aug. 15, 2023, Isaka, et al., cont of PCT/JP2022/003640.
U.S. Appl. No. 18/451,502, filed Aug. 17, 2023, Isaka, et al., cont of PCT/JP2022/003641.
U.S. Appl. No. 18/450,590, filed Aug. 16, 2023, Tsuda, et al., cont of PCT/JP2022/003642.
U.S. Appl. No. 18/450,094, filed Aug. 15, 2023, Hamada, et al., cont of PCT/JP2022/003643.
U.S. Appl. No. 18/449,845, filed Aug. 15, 2023, Zenke, et al., cont of PCT/JP2022/003644.
U.S. Appl. No. 18/446,746, filed Aug. 9, 2023, Isaka, et al., cont of PCT/JP2022/003645.
U.S. Appl. No. 18/450,491, filed Aug. 16, 2023, Isaka, et al., cont of PCT/JP2022/003646.
U.S. Appl. No. 18/451,525, filed Aug. 17, 2023, Isaka, et al., cont of PCT/JP2022/003647.
U.S. Appl. No. 18/451,455, filed Aug. 17, 2023, Isaka, et al., cont of PCT/JP2022/003468.
U.S. Appl. No. 18/452,107, filed Aug. 18, 2023, Isaka, et al., cont of PCT/JP2022/003649.
U.S. Appl. No. 18/452,146, filed Aug. 18, 2023, Isaka, et al., cont of PCT/JP2022/003650.

(56) References Cited

OTHER PUBLICATIONS

U.S. Appl. No. 18/448,341, filed Aug. 11, 2023, Isaka, et al., cont of PCT/JP2022/003651.
U.S. Appl. No. 18/449,778, filed Aug. 15, 2023, Isaka, et al., cont of PCT/JP2022/003652.
U.S. Appl. No. 18/447,877, filed Aug. 10, 2023, Isaka, et al., cont of PCT/JP2022/003653.
U.S. Appl. No. 18/452,908, filed Aug. 21, 2023, Isaka, et al., cont of PCT/JP2022/003654.
U.S. Appl. No. 18/454,141, filed Aug. 23, 2023, Isaka, et al., cont of PCT/JP2022/003657.
U.S. Appl. No. 18/453,709, filed Aug. 22, 2023, Isaka, et al., cont of PCT/JP2022/003658.
U.S. Appl. No. 18/452,769, filed Aug. 21, 2023, Isaka, et al., cont of PCT/JP2022/003659.
U.S. Appl. No. 18/453,810, filed Aug. 22, 2023, Tsuda, et al., cont of PCT/JP2022/003660.
U.S. Appl. No. 18/450,568, filed Aug. 16, 2023, Hamada, et al., cont of PCT/JP2022/003661.
U.S. Appl. No. 18/453,683, filed Aug. 22, 2023, Isaka, et al., cont of PCT/JP2022/003664.
U.S. Appl. No. 18/454,133, filed Aug. 23, 2023, Isaka, et al., cont of PCT/JP2022/003665.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
International Search Report issued Oct. 13, 2020 in International Application No. PCT/JP2020/032236.
International Search Report issued Oct. 13, 2020 in International Application No. PCT/JP2020/032237.
International Search Report issued Oct. 13, 2020 in International Application No. PCT/JP2020/032238.
International Search Report issued Oct. 13, 2020 in International Application No. PCT/JP2020/032239.
International Search Report dated Oct. 6, 2020 in International Application No. PCT/JP2020/032234.
International Preliminary Report on Patentability with Written Opinion dated Mar. 1, 2022 in International Application No. PCT/JP2020/032238.
International Preliminary Report on Patentability with Written Opinion dated Mar. 1, 2022 in International Application No. PCT/JP2020/032239.
International Preliminary Report on Patentability with Written Opinion dated Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability with Written Opinion dated Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 9, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.

(56) References Cited

OTHER PUBLICATIONS

Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
U.S. Appl. No. 17/679,818, filed Feb. 22, 2022, Isaka et al., cont of PCT/JP2020/032236.
U.S. Appl. No. 18/192,101, filed Mar. 29, 2023, Yamamoto et al., cont of PCT/2021/036305.
U.S. Appl. No. 18/192,298, filed Mar. 29, 2029, Isaka et al., cont of PCT/JP2021/036310.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
Extended European Search Report dated Mar. 11, 2026 in application No. 23 780 928.0.

(56) References Cited

OTHER PUBLICATIONS

Extended European Search Report dated Mar. 11, 2026 in application No. 23 780 929.8.
Extended European Search Report dated Mar. 11, 2026 in application No. 23 780 936.3.
Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

COPOLYMER, INJECTION MOLDED BODY, MEMBER TO BE COMPRESSED, AND COATED WIRE

CROSS-REFERENCE TO RELATED APPLICATIONS

This application is a Rule 53(b) Continuation of International Application No. PCT/JP2021/036305 filed Sep. 30, 2021, which claims priority based on Japanese Patent Application No. 2020-166527 filed Sep. 30, 2020, the respective disclosures of which are incorporated herein by reference in their entirety.

TECHNICAL FIELD

The present disclosure relates to a copolymer, an injection molded article, a member to be compressed, and a coated electric wire.

BACKGROUND ART

A known fluororesin having excellent mechanical property, chemical property, electric property, etc., and also being melt-fabricable includes a tetrafluoroethylene/perfluoroalkyl vinyl ether copolymer (PFA).

Patent Document 1 describes a tetrafluoroethylene copolymer composed of tetrafluoroethylene and a perfluoro(alkyl vinyl ether) represented by the following general formula (I):

$$Rf—O—CF═CF_2 \qquad (I)$$

wherein Rf represents a perfluoroalkyl group having 1 to 5 carbon atoms;

wherein the number of unstable terminal groups is 10 to 100 per $10^6$ carbon atoms, and among the unstable terminal groups, the number of —COF and/or —COOH is 10 to 100 in total per $10^6$ carbon atoms.

RELATED ART

Patent Document

Patent Document 1: Japanese Patent Laid-Open No. 2005-320497

SUMMARY

According to the present disclosure, there is provided a copolymer containing tetrafluoroethylene unit and a perfluoro(propyl vinyl ether) unit, wherein the copolymer has a content of the perfluoro(propyl vinyl ether) unit of 5.8 to 7.6% by mass with respect to the whole of the monomer units, a melt flow rate of 50 to 68 g/10 min, and the number of functional groups of 50 or less per $10^6$ main-chain carbon atoms.

Effects

According to the present disclosure, there can be provided a copolymer from which: injection molded articles excellent in the surface smoothness and relatively large and having a thin-wall thickness can be obtained in a very high productivity; a coating layer very thin and little in defects can be easily formed on very small-diameter core wires; and a coating layer excellent in crack resistance at high temperatures can be formed on large-diameter core wires, and which: hardly corrodes metal molds to be used for molding and core wires to be coated; and is excellent also in the electric property, and the copolymer which can give formed articles which: are excellent in the abrasion resistance, the water vapor low permeability, the electrolytic solution low permeability and the heat distortion resistance after immersion in an electrolytic solution; and hardly make fluorine ions to dissolve out in an electrolytic solution.

DESCRIPTION OF EMBODIMENTS

Hereinafter, specific embodiments of the present disclosure will be described in detail, but the present disclosure is not limited to the following embodiments.

A copolymer of the present disclosure contains tetrafluoroethylene (TFE) unit and a perfluoro(propyl vinyl ether) (PPVE) unit.

Patent Document 1 describes that by making the constitution of a tetrafluoroethylene copolymer as described above, there can be provided a TFE copolymer excellent in crack resistance and low in dielectric loss tangent. However, when thin coating is attempted on a core wire small in diameter by using the TFE copolymer described in Patent Document 1, there arises such a problem that: formation of a coating layer uniform in thickness and little in defects is difficult; coating discontinuity is generated during coating formation; sparks are generated in a coating layer of an obtained coated electric wire; and the thickness fluctuates.

It has been found that by regulating the content of the PPVE unit, the melt flow rate (MFR) and the number of functional groups of the copolymer containing the TFE unit and the PPVE unit, and by using such a copolymer, there can easily be formed a coating layer having a very thin thickness of approximately 0.030 mm and being little in defects, on a core wire having a very small core wire diameter of approximately 0.079 mm. It has been also found that such a copolymer hardly corrodes metal molds to be used for molding and core wires to be coated, and is excellent also in the electric property, and moreover, by using such a copolymer, there can be obtained injection molded articles excellent in the surface smoothness and relatively large and having a thin-wall thickness, in a very high productivity; there can be formed a coating layer excellent in crack resistance at high temperatures, on large-diameter core wires; and there can be obtained formed articles which: are excellent in the abrasion resistance, the water vapor low permeability, the electrolytic solution low permeability and the heat distortion resistance after immersion in an electrolytic solution; and hardly make fluorine ions to dissolve out in an electrolytic solution.

The copolymer of the present disclosure is a melt-fabricable fluororesin. Being melt-fabricable means that a polymer can be melted and processed by using a conventional processing device such as an extruder or an injection molding machine.

The content of the PPVE unit of the copolymer is, with respect to the whole of the monomer units, 5.8 to 7.6% by mass. The content of the PPVE unit of the copolymer is preferably 5.9% by mass or higher, more preferably 6.0% by mass or higher, still more preferably 6.2% by mass or higher and especially preferably 6.4% by mass or higher, and preferably 7.3% by mass or lower, more preferably 7.2% by mass or lower, still more preferably 7.1% by mass or lower, especially preferably 7.0% by mass or lower and most preferably 6.8% by mass or lower.

Due to that the content of the PPVE unit of the copolymer is in the above range, the copolymer is such that by using such a copolymer, there can be formed injection molded articles better in the surface smoothness and relatively large and having a thin-wall thickness, in a higher productivity; there can more easily be formed a coating layer very thin and little in defects, on very small-diameter core wires; there can be formed a coating layer better in crack resistance at high temperatures, on large-diameter core wires; and there can be obtained formed articles which are excellent in the abrasion resistance, the water vapor low permeability, the electrolytic solution low permeability and the heat distortion resistance after immersion in an electrolytic solution. When the content of the PPVE unit of the copolymer is too low, in the case of using, at high temperatures, a coated electric wire obtained by forming a coating layer on a large-diameter core wire, generation of cracks in the coating layer may not sufficiently be suppressed. When the content of the PPVE unit of the copolymer is too low, there may not be obtained formed articles excellent in the abrasion resistance and the heat distortion resistance after immersion in an electrolytic solution. When the content of the PPVE unit of the copolymer is too high, there may not be obtained formed articles which can sufficiently suppress the permeation of water vapor and the permeation of an electrolytic solution, and there may be generated forming defects such as surface roughening of the formed articles and coating discontinuity.

The content of the TFE unit of the copolymer is, with respect to the whole of the monomer units, preferably 92.4 to 94.2% by mass, more preferably 94.1% by mass or lower, still more preferably 94.0% by mass or lower, further still more preferably 93.8% by mass or lower and especially preferably 93.6% by mass or lower, and more preferably 92.7% by mass or higher, still more preferably 92.8% by mass or higher, further still more preferably 92.9% by mass or higher, especially preferably 93.0% by mass or higher and especially preferably 93.2% by mass or higher. Due to that the content of the TFE unit of the copolymer is in the above range, the copolymer is such that by using such a copolymer, there can be formed injection molded articles better in the surface smoothness and relatively large and having a thin-wall thickness in a higher productivity; there can more easily be formed a coating layer very thin and little in defects, on very small-diameter core wires; there can be formed a coating layer better in crack resistance at high temperatures, on large-diameter core wires; and there can be obtained formed articles which are excellent in the abrasion resistance, the water vapor low permeability, the electrolytic solution low permeability and the heat distortion resistance after immersion in an electrolytic solution.

In the present disclosure, the content of each monomer unit in the copolymer is measured by a $^{19}$F-NMR method.

The copolymer can also contain a monomer unit originated from a monomer copolymerizable with TFE and PPVE. In this case, the content of the monomer unit copolymerizable with TFE and PPVE is, with respect to the whole of monomer units of the copolymer, preferably 0 to 4.0% by mass, more preferably 0.05 to 1.8% by mass and still more preferably 0.1 to 0.5% by mass.

The monomers copolymerizable with TFE and PPVE may include hexafluoropropylene (HFP), vinyl monomers represented by $CZ^1Z^2{=}CZ^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2{=}CF{-}OCH_2{-}Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the PPVE unit, and TFE/HFP/PPVE copolymer, and is more preferably a copolymer consisting only of the TFE unit and the PPVE unit.

The melt flow rate (MFR) of the copolymer is 50 to 68 g/10 min. The melt flow rate (MFR) of the copolymer is preferably 52 g/10 min or higher, more preferably 53 g/10 min or higher, still more preferably 54 g/10 min or higher and further still more preferably 56 g/10 min or higher, and preferably 65 g/10 min or lower, more preferably 64 g/10 min or lower, and still more preferably 62 g/10 min or lower.

Due to that the MFR of the copolymer is in the above range, the copolymer is such that by using such a copolymer, there can be formed injection molded articles better in the surface smoothness and relatively large and having a thin-wall thickness in a higher productivity; there can more easily be formed a coating layer very thin and little in defects, on very small-diameter core wires; there can be formed a coating layer better in crack resistance at high temperatures, on large-diameter core wires; and there can be obtained formed articles which are excellent in the abrasion resistance. Moreover, due to that the MFR of the copolymer is in the above range, the number of sparks generated in a coating layer obtained by using such a copolymer can be reduced.

When the MFR of the copolymer is too low, injection molded articles excellent in surface smoothness may not be obtained in a high productivity under suppression of generation of forming defects, and a coating layer very thin and little in defects may not be easily formed on core wires very small in diameter. When the MFR is too low, there may not be obtained formed articles which can sufficiently suppress the permeation of water vapor and the permeation of an electrolytic solution. When the MFR is too high, formed articles excellent in abrasion resistance may not be obtained, and in the case of forming a coating layer on a large-diameter core wire and using an obtained coated electric wire at high temperatures, the generation of cracks in the coating layer may not be sufficiently suppressed. Further, due to that the MFR of the copolymer is in the above range, the fluidity during forming of the copolymer is improved, thereby allowing a relatively low forming temperature to be adopted, and consequently, the corrosion of metal molds to be used for molding and the corrosion of core wires of electric wires can be suppressed. Further, by using the copolymer of the present disclosure, small injection molded articles having a thin-wall thickness can be produced simultaneously in a large number thereof.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

The number of functional groups per $10^6$ main-chain carbon atoms of the copolymer is 50 or less. The number of functional groups per $10^6$ main-chain carbon atoms of the copolymer is preferably 40 or less, more preferably 30 or less, still more preferably 20 or less, further still more preferably 15 or less, especially preferably 10 or less and most preferably 6 or less.

Due to that the number of functional groups of the copolymer is in the above range, the corrosion of metal molds to be used for molding and core wires to be coated can more be suppressed; forming defects such as coating discontinuity can more be suppressed; and the electric property of the copolymer can more be improved. Further, formed articles can be obtained which are excellent in the electrolytic solution low permeability and hardly make fluorine ions to dissolve out in an electrolytic solution.

Further, due to that the number of functional groups of the copolymer is in the above range, decomposition of the functional groups of the copolymer and generation of gases, which causes forming defects such as foaming, can be suppressed, whereby the number of such defects in a coating layer that generate sparks can be reduced and the defects in the coating layer causing cracks to be generated can be reduced. Moreover, in either case of a case of using a multi-cavity metal mold for molding a number of thin-wall thickness injection molded articles and a case of using a single-cavity metal mold for molding a thin-wall thickness large injection molded article, the corrosion of the metal mold can be suppressed. When the number of functional groups of the copolymer is too large, the possibility of causing forming defects and the metal mold corrosion becomes high. By lowering the forming temperature, these possibilities can be reduced, but since when the forming temperature is lowered, the moldability of the copolymer deteriorates, there arises a need of raising the MFR of the copolymer; and there may not be obtained formed articles which can sufficiently suppress generation of cracks and the abrasion, and in the case of forming a thick coating layer on a large-diameter core wire and using an obtained coated electric wire at high temperatures, the generation of cracks in the coating layer may not be able to be sufficiently suppressed. When the number of functional groups of the copolymer is in the above range, even when the MFR of the copolymer is in the above range, the copolymer can be formed without lowering the forming temperature and formed articles having excellent physical properties can be obtained in a high productivity.

For identification of the kind of the functional groups and measurement of the number of the functional groups, infrared spectroscopy can be used.

The number of the functional groups is measured, specifically, by the following method. First, the copolymer is molded by cold press to prepare a film of 0.25 to 0.3 mm in thickness. The film is analyzed by Fourier transform infrared spectroscopy to obtain an infrared absorption spectrum of the copolymer, and a difference spectrum against a base spectrum that is completely fluorinated and has no functional groups is obtained. From an absorption peak of a specific functional group observed on this difference spectrum, the number N of the functional group per $1\times10^6$ carbon atoms in the copolymer is calculated according to the following formula (A).

$$N=I\times K/t \quad (A)$$

I: absorbance

K: correction factor t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —$CF{=}CF_2$ | 1795 | 635 | 366 | $CF_2{=}CF_2$ |

Absorption frequencies of —$CH_2CF_2H$, —$CH_2COF$, —$CH_2COOH$, —$CH_2COOCH_3$ and —$CH_2CONH_2$ are lower by a few tens of kaysers ($cm^{-1}$) than those of —$CF_2H$, —COF, —COOH free and —COOH bonded, —$COOCH_3$ and —$CONH_2$ shown in the Table, respectively.

For example, the number of the functional group —COF is the total of the number of a functional group determined from an absorption peak having an absorption frequency of 1,883 $cm^{-1}$ derived from —$CF_2COF$ and the number of a functional group determined from an absorption peak having an absorption frequency of 1,840 $cm^{-1}$ derived from —$CH_2COF$.

The functional groups are ones present on main chain terminals or side chain terminals of the copolymer, and ones present in the main chain or the side chains. The number of the functional groups may be the total of numbers of —$CF{=}CF_2$, —$CF_2H$, —COF, —COOH, —$COOCH_3$, —$CONH_2$ and —$CH_2OH$.

The functional groups are introduced to the copolymer by, for example, a chain transfer agent or a polymerization initiator used for production of the copolymer. For example, in the case of using an alcohol as the chain transfer agent, or a peroxide having a structure of —$CH_2OH$ as the polymerization initiator, —$CH_2OH$ is introduced on the main chain terminals of the copolymer. Further, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer of the present disclosure is preferably one which is subjected to the fluorination treatment. Further, the copolymer of the present disclosure preferably has —$CF_3$ terminal groups.

The melting point of the copolymer of the present disclosure is preferably 285° C. or higher, more preferably 288° C. or higher, still more preferably 290° C. or higher, especially preferably 291 to 310° C. and most preferably 296 to 305° C. Due to that the melting point is in the above range, there can be obtained the copolymer which gives formed articles better in the crack resistance at high temperatures.

In the present disclosure, the melting point can be measured by using a differential scanning calorimeter [DSC].

The water vapor permeability of the copolymer of the present disclosure is preferably 13 g·cm/$m^2$ or lower and still more preferably 12 g·cm/$m^2$ or lower. Due to that the content of the PPVE unit and the melt flow rate (MFR) of the copolymer containing the TFE unit and the PPVE unit are suitably regulated, the copolymer has excellent water vapor low permeability. Hence, by using a formed article containing the copolymer of the present disclosure, for example, as a member to be compressed of a secondary battery, the permeability of moisture can effectively be prevented even under a high-temperature high-humidity condition.

In the present disclosure, the water vapor permeability can be measured under the condition of a temperature of 95° C. and for 30 days.

The electrolytic solution permeability of the copolymer is preferably 6.5 g·cm/$m^2$ or lower and more preferably 6.3 g·cm/$m^2$ or lower. Due to that the content of the PPVE unit, the melt flow rate (MFR) and the number of functional groups of the copolymer containing the TFE unit and the PPVE unit are suitably regulated, the copolymer has a remarkably excellent electrolytic solution low permeability. Hence, by using a formed article containing the copolymer of the present disclosure, for example, as a member to be compressed of a secondary battery, the permeation of an electrolytic solution accommodated in a secondary battery can effectively be prevented.

In the present disclosure, specific measurement of the electrolytic solution permeability can be carried out by a method described in Examples.

In the copolymer of the present disclosure, the amount of fluorine ions dissolving out therefrom detected by an electrolytic solution immersion test is, in terms of mass, preferably 1.0 ppm or lower, more preferably 0.8 ppm or lower and still more preferably 0.7 ppm or lower. Due to that the amount of fluorine ions dissolving out is in the above range, the generation of gasses such as HF in a non-aqueous electrolyte battery can be more suppressed, and the deterioration and the shortening of the service life of the battery performance of a non-aqueous electrolyte battery can be more suppressed.

In the present disclosure, the electrolytic solution immersion test can be carried out by preparing a test piece of the copolymer having a weight corresponding to that of 10 sheets of formed articles (15 mm×15 mm×0.2 mm) of the copolymer, and putting, in a thermostatic chamber of 80° C., a glass-made sample bottle in which the test piece and 2 g of dimethyl carbonate (DMC) and allowing the resultant to stand for 144 hours.

The dielectric loss tangent at 6 GHz of the copolymer of the present disclosure is preferably $6.0\times10^{-4}$ or lower, more preferably $5.0\times10^{-4}$ or lower and still more preferably $4.0\times10^{-4}$ or lower. In recent years, along with the increase in the amount of information to be transmitted, radio waves in high frequency regions are likely to be increasingly used. For example, for high frequency wireless LAN, satellite communication, cell phone base stations and the like, microwaves of 3 to 30 GHz are used. As materials to be used for communication devices using such high frequencies, materials having a low dielectric loss tangent (tan δ) are demanded. When the dielectric loss tangent of the copolymer of the present disclosure is in the above range, since the attenuation factor of high frequency signals largely decreases, the case is preferable.

In the present disclosure, the dielectric loss tangent is a value obtained by using a network analyzer, manufactured by Agilent Technologies Inc., and a cavity resonator, and measuring the changes in the resonance frequency and the electric field strength in the temperature range of 20 to 25° C.

The copolymer of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator or a water-soluble radical initiator may be used.

The oil-soluble radical polymerization initiator may be a known oil-soluble peroxide, and examples thereof typically include:

- dialkyl peroxycarbonates such as di-n-propyl peroxydicarbonate, diisopropyl peroxydicarbonate, di-sec-butyl peroxydicarbonate and di-2-ethoxyethyl peroxydicarbonate;
- peroxyesters such as t-butyl peroxyisobutyrate and t-butyl peroxypivalate;
- dialkyl peroxides such as di-t-butyl peroxide; and
- di[fluoro(or fluorochloro)acyl] peroxides.

The di[fluoro(or fluorochloro)acyl] peroxides include diacyl peroxides represented by $[(RfCOO)—]_2$ wherein Rf is a perfluoroalkyl group, an ω-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2CF_2H$ and $CF_3CF_2CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, $—COOCH_3$, $—CH_2OH$, —COF, $—CF{=}CF_2$ and $—CONH_2$, and thermally relatively stable functional groups thereof, such as $—CF_2H$, can be converted to thermally very stable $—CF_3$. Consequently, the total number (number of functional groups) of —COOH, $—COOCH_3$, $—CH_2OH$, —COF, $—CF{=}CF_2$, $—CONH_2$ and $—CF_2H$ of the copolymer can easily be controlled in the above-mentioned range.

The fluorine-containing compound is not limited, but includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, halogen fluorides (for example, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas ($F_2$ gas).

A composition may be obtained by mixing the copolymer of the present disclosure and as required, other components. The other components include fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

A method of producing the composition includes a method of dry mixing the copolymer and the other components, and a method of previously mixing the copolymer and the other components by a mixer and then melt kneading the mixture by a kneader, melt extruder or the like.

The copolymer of the present disclosure or the above-mentioned composition can be used as a processing aid, a forming material and the like, but use as a forming material is suitable. Further, there can also be utilized aqueous dispersions, solutions and suspensions of the copolymer of the present disclosure, and the copolymer/solvent-based materials; and these can be used for application of coating materials, encapsulation, impregnation, and casting of films. However, since the copolymer of the present disclosure has the above-mentioned properties, it is preferable to use the copolymer as the forming material.

Molded articles may be obtained by forming the copolymer of the present disclosure or the above composition.

A method of forming the copolymer or the composition is not limited, and includes injection molding, extrusion forming, compression molding, blow molding, transfer molding, rotomolding and rotolining molding. As the forming method, among these, preferable are extrusion forming, compression molding, injection molding and transfer molding; from the viewpoint that formed articles can be produced in a high productivity, more preferable are extrusion forming, injection molding and transfer molding, and still more preferable are extrusion forming and injection molding. That is, it is preferable that formed articles are extrusion formed articles, compression formed articles, injection molded articles or transfer molded articles; and from the viewpoint of being able to produce formed articles in a high productivity, being extrusion formed articles, injection molded articles or transfer molded articles is more preferable, and being extrusion formed articles or injection molded articles is still more preferable.

The shapes of the formed articles are not limited, and may be shapes of, for example, hoses, pipes, tubes, electric wire coatings, sheets, seals, gaskets, packings, films, tanks, rollers, bottles and containers.

The copolymer of the present disclosure, the above composition and the above formed articles can be used, for example, in the following applications.

Food packaging films, and members for liquid transfer for food production apparatuses, such as lining materials of fluid transfer lines, packings, sealing materials and sheets, used in food production processes;

- chemical stoppers and packaging films for chemicals, and members for chemical solution transfer, such as lining materials of liquid transfer lines, packings, sealing materials and sheets, used in chemical production processes;
- inner surface lining materials of chemical solution tanks and piping of chemical plants and semiconductor factories;
- members for fuel transfer, such as O (square) rings, tubes, packings, valve stem materials, hoses and sealing materials, used in fuel systems and peripheral equipment of automobiles, and such as hoses and sealing materials, used in ATs of automobiles;
- members used in engines and peripheral equipment of automobiles, such as flange gaskets of carburetors, shaft seals, valve stem seals, sealing materials and hoses, and other vehicular members such as brake hoses, hoses for air conditioners, hoses for radiators, and electric wire coating materials;
- members for chemical transfer for semiconductor production apparatuses, such as O (square) rings, tubes, packings, valve stem materials, hoses, sealing materials, rolls, gaskets, diaphragms and joints;
- members for coating and inks, such as coating rolls, hoses and tubes, for coating facilities, and containers for inks;
- members for food and beverage transfer, such as tubes, hoses, belts, packings and joints for food and beverage, food packaging materials, and members for glass cooking appliances;
- members for waste liquid transport, such as tubes and hoses for waste transport;
- members for high-temperature liquid transport, such as tubes and hoses for high-temperature liquid transport;
- members for steam piping, such as tubes and hoses for steam piping;
- corrosion proof tapes for piping, such as tapes wound on piping of decks and the like of ships;
- various coating materials, such as electric wire coating materials, optical fiber coating materials, and transparent front side coating materials installed on the light incident side and back side lining materials of photoelectromotive elements of solar cells;
- diaphragms and sliding members such as various types of packings of diaphragm pumps;
- films for agriculture, and weathering covers for various kinds of roof materials, sidewalls and the like;
- interior materials used in the building field, and coating materials for glasses such as non-flammable fireproof safety glasses; and
- lining materials for laminate steel sheets used in the household electric field.

The fuel transfer members used in fuel systems of automobiles further include fuel hoses, filler hoses and evap hoses. The above fuel transfer members can also be used as fuel transfer members for gasoline additive-containing fuels, resultant to sour gasoline, resultant to alcohols, and resultant to methyl tertiary butyl ether and amines and the like.

The above chemical stoppers and packaging films for chemicals have excellent chemical resistance to acids and the like. The above chemical solution transfer members also include corrosionproof tapes wound on chemical plant pipes.

The above formed articles also include vehicular radiator tanks, chemical solution tanks, bellows, spacers, rollers and gasoline tanks, waste solution transport containers, high-temperature liquid transport containers and fishery and fish farming tanks.

The above formed articles further include members used for vehicular bumpers, door trims and instrument panels, food processing apparatuses, cooking devices, water- and oil-repellent glasses, illumination-related apparatuses, display boards and housings of OA devices, electrically illuminated billboards, displays, liquid crystal displays, cell phones, printed circuit boards, electric and electronic components, sundry goods, dust bins, bathtubs, unit baths, ventilating fans, illumination frames and the like.

Due to that the formed articles containing the copolymer of the present disclosure are excellent in the abrasion resistance, the water vapor low permeability, the electrolytic solution low permeability and the heat distortion resistance after immersion in an electrolytic solution, and hardly make fluorine ions to dissolve out in an electrolytic solution, the formed articles can suitably be utilized as members to be compressed containing the copolymer.

The members to be compressed of the present disclosure can be used in a state of being compressed at a compression deformation rate of 10% or higher, and can be used in a state of being compressed at a compression deformation rate of 20% or higher or 25% or higher. By using the members to be compressed of the present disclosure by being deformed at such a high compression deformation rate, a certain rebound resilience can be retained for a long term and the sealing property and the insulating property can be retained for a long term.

The members to be compressed of the present disclosure can be used at 150° C. or higher and in a state of being compression deformed at a compression deformation rate of 10% or higher, and can be used at 150° C. or higher and in a state of being compression deformed at a compression deformation rate of 20% or higher or 25% or higher. By using the members to be compressed of the present disclosure by being deformed at such a high temperature and at such a high compression deformation rate, a certain rebound resilience can be retained for a long term and the sealing property and the insulating property at high temperatures can be retained for a long term.

In the case where the members to be compressed are used in a state of being compressed, the compression deformation rate is a compression deformation rate of a portion having the highest compression deformation rate. For example, in the case where a flat member to be compressed is used in a state of being compressed in the thickness direction, the compression deformation rate is that in the thickness direction. Further for example, in the case where a member to be compressed is used with only some portions of the member in a state of being compressed, the compression deformation rate is that of a portion having the highest compression deformation rate among compression deformation rates of the compressed portions.

The size and shape of the members to be compressed of the present disclosure may suitably be set according to applications, and are not limited. The shape of the members to be compressed of the present disclosure may be, for example, annular. The members to be compressed of the present disclosure may also have, in plan view, a circular shape, an elliptic shape, a corner-rounded square or the like, and may be a shape having a throughhole in the central portion thereof.

It is preferable that the members to be compressed of the present disclosure are used as members constituting non-aqueous electrolyte batteries. Due to that the members to be compressed of the present disclosure are excellent in the abrasion resistance, the water vapor low permeability, the electrolytic solution low permeability and the heat distortion resistance after immersion in an electrolytic solution, and hardly make fluorine ions to dissolve out in an electrolytic solution, the members are especially suitable as members used in a state of contacting with a non-aqueous electrolyte in the non-aqueous electrolyte batteries. That is, the members to be compressed of the present disclosure may also be ones having a liquid-contact surface with a non-aqueous electrolyte in the non-aqueous electrolyte batteries.

The members to be compressed of the present disclosure hardly make fluorine ions to dissolve out in non-aqueous electrolytic solutions. Therefore, by using the members to be compressed of the present disclosure, the rise in the fluorine ion concentration in the non-aqueous electrolyte solutions can be suppressed. Consequently, by using the members to be compressed of the present disclosure, the generation of gases such as HF in the non-aqueous electrolyte solutions can be suppressed, and the deterioration and the shortening of the service life of the battery performance of the non-aqueous electrolyte solution batteries can be suppressed.

From the viewpoint that the members to be compressed of the present disclosure can more suppress the generation of gases such as HF in non-aqueous electrolyte solutions, and can more suppress the deterioration and the shortening of the service life of the battery performance of non-aqueous electrolyte solution batteries, the amount of fluorine ions dissolving out to be detected in an electrolytic solution immersion test is, in terms of mass, preferably 1.0 ppm or smaller, more preferably 0.8 ppm or smaller and still more preferably 0.7 ppm or smaller. The electrolytic solution immersion test can be carried out by preparing a test piece having a weight equivalent to 10 sheets of a molded article (15 mm×15 mm×0.2 mm) using a member to be compressed, and putting a glass-made sample bottle in which the test piece and 2 g of dimethyl carbonate (DMC) have been charged in a constant-temperature vessel at 80° C. and allowing the sample bottle to stand for 144 hours.

The members to be compressed of the present disclosure hardly make water vapor to penetrate. Therefore, by using the members to be compressed of the present disclosure, the permeation of water vapor from the outside to secondary batteries can be suppressed. Consequently, by using the members to be compressed of the present disclosure, the deterioration of the battery performance and the shortening of the service life of non-aqueous electrolyte batteries can be suppressed.

The water vapor permeability of the members to be compressed of the present disclosure is, from the viewpoint that the deterioration of the battery performance and the shortening of the service life of non-aqueous electrolyte batteries can be more suppressed, preferably 13 $g \cdot cm/m^2$ or lower and still more preferably 12 $g \cdot cm/m^2$ or lower. The water vapor permeability can be measured under the condition of a temperature of 95° C. and for 30 days.

The non-aqueous electrolyte batteries are not limited as long as being batteries having a non-aqueous electrolyte, and examples thereof include lithium ion secondary batteries and lithium ion capacitors. Members constituting the non-aqueous electrolyte batteries include sealing members and insulating members.

For the non-aqueous electrolyte, one or two or more of well-known solvents can be used such as propylene carbonate, ethylene carbonate, butylene carbonate, γ-butyllactone, 1,2-dimethoxyethane, 1,2-diethoxyethane, dimethyl carbonate, diethyl carbonate and ethyl methyl carbonate. The non-aqueous electrolyte batteries may further have an electrolyte. The electrolyte is not limited, but may be $LiClO_4$, $LiAsF_6$, $LiPF_6$, $LiBF_4$, LiCl, LiBr, $CH_3SO_3Li$, $CF_3SO_3Li$, cesium carbonate and the like.

The members to be compressed of the present disclosure can suitably be utilized, for example, as sealing members such as sealing gaskets and sealing packings, and insulating members such as insulating gaskets and insulating packings. The sealing members are members to be used for preventing leakage of a liquid or a gas, or penetration of a liquid or a gas from the outside. The insulating members are members to be used for insulating electricity. The members to be compressed of the present disclosure may also be members to be used for the purpose of both of sealing and insulation.

The members to be compressed of the present disclosure may be used under an environment of becoming high temperatures. The members to be compressed of the present disclosure may be used, for example, in an environment where the maximum temperature becomes 40° C. or higher. The members to be compressed of the present disclosure may be used, for example, in an environment where the maximum temperature becomes 150° C. or higher. Examples of the case where the temperature of the members to be compressed of the present disclosure may become such high temperatures include the case where after a member to be compressed is installed in a state of being compressed to a battery, other battery members are installed to the battery by welding, and the case where a non-aqueous electrolyte battery generates heat.

Due to that the members to be compressed of the present disclosure are excellent in the water vapor low permeability and the electrolytic solution low permeability, and hardly make fluorine ions to dissolve out in an electrolytic solution, the members to be compressed can suitably be used as sealing members for non-aqueous electrolyte batteries or insulating members for non-aqueous electrolyte batteries. The members to be compressed of the present disclosure, in the case of being used as sealing members, retain the excellent sealing property for a long term. Further, the members to be compressed of the present disclosure, due to containing the above copolymer, have the excellent insulating property. Therefore, in the case of using the members to be compressed of the present disclosure as insulating members, the member firmly adhere to two or more electrically conductive members and prevent short circuit over a long term.

The copolymer of the present disclosure, due to that the dielectric loss tangent at 6 GHz is low, can suitably be utilized as a material for products for high-frequency signal transmission.

The products for high-frequency signal transmission are not limited as long as being products to be used for transmission of high-frequency signals, and include (1) formed boards such as insulating boards for high-frequency circuits, insulating materials for connection parts and printed circuit boards, (2) formed articles such as bases of high-frequency vacuum tubes and antenna covers, and (3) coated electric wires such as coaxial cables and LAN cables. The products for high-frequency signal transmission can suitably be used in devices utilizing microwaves, particularly microwaves of 3 to 30 GHz, in satellite communication devices, cell phone base stations, and the like.

In the products for high-frequency signal transmission, the copolymer of the present disclosure can suitably be used as an insulator in that the dielectric loss tangent is low.

As the (1) formed boards, printed wiring boards are preferable in that the good electric property is provided. The printed wiring boards are not limited, but examples thereof include printed wiring boards of electronic circuits for cell phones, various computers, communication devices and the like. As the (2) formed articles, antenna covers are preferable in that the dielectric loss is low.

As the (3) coated electric wires, preferable are coated electric wires having a coating layer containing the copolymer of the present disclosure. That is, formed articles containing the copolymer of the present disclosure can suitably be utilized as coating layers containing the copolymer. The copolymer of the present disclosure hardly corrodes core wires to be coated, and is excellent also in the electric property. Further, by using the copolymer of the present disclosure, there can easily be formed the coating layer very thin and little in defects on the core wires very small in diameter; and there can be formed the coating layer excellent in the crack resistance at high temperatures, on the core wires large in diameter. Therefore, the coated electric wire having the coating layer containing the copolymer of the present disclosure is excellent in the electric property and the crack resistance, and is excellent also in the insulating property of the coating layer.

The coated electric wire has a core wire, and the coating layer installed on the periphery of the core wire and containing the copolymer of the present disclosure. The coated electric wires, due to that the coating layer has excellent heat resistance and a low dielectric loss tangent, are suitable to high-frequency transmission cables, flat cables, heat-resistant cables and the like, and particularly to high-frequency transmission cables.

As a material for the core wire, for example, a metal conductor material such as copper or aluminum can be used. The core wire is preferably one having a diameter of 0.01 to 3 mm. The diameter of the core wire is more preferably 0.04 mm or larger and still more preferably 0.05 mm or larger. The diameter of the core wire is more preferably 2 mm or smaller and may be 0.10 mm or 0.08 mm or smaller.

With regard to specific examples of the core wire, there may be used, for example, AWG (American Wire Gauge)-46 (solid copper wire of 40 μm in diameter), AWG-40 (solid copper wire of 79 μm in diameter), AWG-26 (solid copper wire of 404 μm in diameter), AWG-24 (solid copper wire of 510 μm in diameter), and AWG-22 (solid copper wire of 635 μm in diameter).

The coating layer is preferably one having a thickness of 0.01 to 3.0 mm. It is also preferable that the thickness of the coating layer is 2.0 mm or smaller. By using the copolymer, the coating layer of 0.05 mm or smaller, 0.04 mm or smaller or 0.03 mm or smaller in thickness can be formed without any problem.

The high-frequency transmission cables include coaxial cables. The coaxial cables generally have a structure configured by laminating an inner conductor, an insulating coating layer, an outer conductor layer and a protective coating layer in order from the core part to the peripheral part. A formed article containing the copolymer of the present disclosure can suitably be utilized as the insulating coating layer containing the copolymer. The thickness of each layer in the above structure is not limited, but is usually: the diameter of the inner conductor is approximately 0.01 to 3 mm; the thickness of the insulating coating layer is approximately 0.03 to 3 mm; the thickness of the outer conductor layer is approximately 0.5 to 10 mm; and the thickness of the protective coating layer is approximately 0.5 to 2 mm.

Alternatively, the coating layer may be one containing cells, and is preferably one in which cells are homogeneously distributed.

The average cell size of the cells is not limited, but is, for example, preferably 60 μm or smaller, more preferably 45 μm or smaller, still more preferably 35 μm or smaller, further still more preferably 30 μm or smaller, especially preferable 25 μm or smaller and further especially preferably 23 μm or smaller. Then, the average cell size is preferably 0.1 μm or larger and more preferably 1 μm or larger. The average cell size can be determined by taking an electron microscopic image of an electric wire cross section, calculating the diameter of each cell and averaging the diameters.

The foaming ratio of the coating layer may be 20% or higher, and is more preferably 30% or higher, still more preferably 33% or higher and further still more preferably 35% or higher. The upper limit is not limited, but is, for example, 80%. The upper limit of the foaming ratio may be 60%. The foaming ratio is a value determined as ((the specific gravity of an electric wire coating material−the specific gravity of the coating layer)/(the specific gravity of the electric wire coating material)×100. The foaming ratio can suitably be regulated according to applications, for example, by regulation of the amount of a gas, described later, to be injected in an extruder, or by selection of the kind of a gas dissolving.

Alternatively, the coated electric wire may have another layer between the core wire and the coating layer, and may further have another layer (outer layer) on the periphery of the coating layer. In the case where the coating layer contains cells, the electric wire of the present disclosure may be of a two-layer structure (skin-foam) in which a non-foaming layer is inserted between the core wire and the coating layer, a two-layer structure (foam-skin) in which a non-foaming layer is coated as the outer layer, or a three-layer structure (skin-foam-skin) in which a non-foaming layer is coated as the outer layer of the skin-foam structure. The non-foaming layer is not limited, and may be a resin layer composed of a resin, such as a TFE/HFP-based copolymer, a TFE/PAVE copolymer, a TFE/ethylene-based copolymer, a vinylidene fluoride-based polymer, a polyolefin resin such as polyethylene [PE], or polyvinyl chloride [PVC].

The coated electric wire can be produced, for example, by using an extruder, heating the copolymer, extruding the copolymer in a melt state on the core wire to thereby form the coating layer.

In formation of a coating layer, by heating the copolymer and introducing a gas in the copolymer in a melt state, the coating layer containing cells can be formed. As the gas, there can be used, for example, a gas such as chlorodifluoromethane, nitrogen or carbon dioxide, or a mixture thereof. The gas may be introduced as a pressurized gas in the heated copolymer, or may be generated by mingling a chemical foaming agent in the copolymer. The gas dissolves in the copolymer in a melt state.

So far, embodiments have been described, but it is to be understood that various changes and modifications of patterns and details may be made without departing from the subject matter and the scope of the claims.

According to the present disclosure, there is provided a copolymer containing tetrafluoroethylene unit and a perfluoro(propyl vinyl ether) unit, wherein the copolymer has a content of the perfluoro(propyl vinyl ether) unit of 5.8 to 7.6% by mass with respect to the whole of the monomer units, a melt flow rate of 50 to 68 g/10 min, and the number of functional groups of 50 or less per $10^6$ main-chain carbon atoms.

According to the present disclosure, an injection molded article comprising the above copolymer is further provided.

According to the present disclosure, a member to be compressed comprising the above copolymer is further provided.

According to the present disclosure, a coated electric wire having a coating layer comprising the above copolymer is further provided.

EXAMPLES

The embodiments of the present disclosure will be described by Examples as follows, but the present disclosure is not limited only to these Examples.

Each numerical value in Examples and Comparative Examples was measured by the following methods.

(Content of a Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Number of Functional Groups)

Pellets of the copolymer was molded by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1\times10^6$ carbon atoms in the sample was calculated according to the following formula (A).

$$N=I\times K/t \tag{A}$$

I: absorbance

K: correction factor t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —$CF{=}CF_2$ | 1795 | 635 | 366 | $CF_2{=}CF_2$ |

(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.

Example 1

34.0 L of pure water was charged in a 174 L-volume autoclave; nitrogen replacement was sufficiently carried out; thereafter, 30.4 kg of perfluorocyclobutane, 1.26 kg of perfluoro(propyl vinyl ether) (PPVE) and 2.28 kg of methanol were charged; and the temperature in the system was held at 35° C. and the stirring speed was held at 200 rpm. Then, tetrafluoroethylene (TFE) was introduced under pressure up to 0.6 MPa, and thereafter 0.060 kg of a 50% methanol solution of di-n-propyl peroxydicarbonate was charged to initiate polymerization. Since the pressure in the system decreased along with the progress of the polymerization, TFE was continuously supplied to make the pressure constant, and 0.064 kg of PPVE was added for every 1 kg of TFE supplied and the polymerization was continued for 25 hours. TFE was released to return the pressure in the autoclave to the atmospheric pressure, and thereafter, an obtained reaction product was washed with water and dried to thereby obtain 30 kg of a powder.

The obtained powder was melt extruded at 360° C. by a screw extruder (trade name: PCM46, manufactured by Ikegai Corp.) to thereby obtain pellets of a TFE/PPVE copolymer. The PPVE content of the obtained pellets was measured by the method described above. The result is shown in Table 3.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. By using the fluorinated pellets, the above physical properties were measured by the methods described above. The results are shown in Table 3.

Example 2

Fluorinated pellets were obtained as in Example 1, except for changing the charged amount of PPVE to 1.31 kg, changing the charged amount of methanol to 2.36 kg, and adding 0.066 kg of PPVE for every 1 kg of TFE supplied. The results are shown in Table 3.

Example 3

Fluorinated pellets were obtained as in Example 1, except for changing the charged amount of PPVE to 1.36 kg, changing the charged amount of methanol to 2.36 kg, adding 0.068 kg of PPVE for every 1 kg of TFE supplied, and changing the polymerization time to 25.5 hours. The results are shown in Table 3.

Example 4

Fluorinated pellets were obtained as in Example 1, except for changing the charged amount of PPVE to 1.41 kg, changing the charged amount of methanol to 2.40 kg, adding 0.071 kg of PPVE for every 1 kg of TFE supplied, and changing the polymerization time to 26 hours. The results are shown in Table 3.

Example 5

Fluorinated pellets were obtained as in Example 1, except for changing the charged amount of PPVE to 1.49 kg, changing the charged amount of methanol to 2.44 kg, adding 0.074 kg of PPVE for every 1 kg of TFE supplied, and changing the polymerization time to 26 hours. The results are shown in Table 3.

Example 6

Fluorinated pellets were obtained as in Example 1, except for changing the charged amount of PPVE to 1.51 kg, changing the charged amount of methanol to 2.67 kg, adding 0.075 kg of PPVE for every 1 kg of TFE supplied, and changing the polymerization time to 27 hours. The results are shown in Table 3.

Example 7

Fluorinated pellets were obtained as in Example 1, except for changing the charged amount of PPVE to 1.54 kg, changing the charged amount of methanol to 2.43 kg, adding 0.076 kg of PPVE for every 1 kg of TFE supplied, and changing the polymerization time to 27 hours. The results are shown in Table 3.

Example 8

Fluorinated pellets were obtained as in Example 1, except for changing the charged amount of PPVE to 1.46 kg, changing the charged amount of methanol to 2.20 kg, adding 0.073 kg of PPVE for every 1 kg of TFE supplied, and changing the polymerization time to 26 hours. The results are shown in Table 3.

Example 9

Fluorinated pellets were obtained as in Example 1, except for changing the charged amount of PPVE to 1.67 kg, changing the charged amount of methanol to 1.53 kg, adding 0.082 kg of PPVE for every 1 kg of TFE supplied, changing the polymerization time to 28 hours, and changing the raised temperature of the vacuum vibration-type reactor to 160° C., and changing the reaction condition to at 160° C. and for 5 hours. The results are shown in Table 3.

Comparative Example 1

Fluorinated pellets were obtained as in Example 1, except for changing the charged amount of PPVE to 1.11 kg, changing the charged amount of methanol to 3.50 kg, adding 0.057 kg of PPVE for every 1 kg of TFE supplied, and changing the polymerization time to 24.5 hours. The results are shown in Table 3.

Comparative Example 2

Fluorinated pellets were obtained as in Example 1, except for changing the charged amount of PPVE to 1.14 kg, changing the charged amount of methanol to 3.10 kg, adding 0.058 kg of PPVE for every 1 kg of TFE supplied, changing the polymerization time to 24.5 hours, and changing the raised temperature of the vacuum vibration-type reactor to 170° C., and changing the reaction condition to at 170° C. and for 5 hours. The results are shown in Table 3.

Comparative Example 3

Fluorinated pellets were obtained as in Example 1, except for changing the charged amount of PPVE to 1.51 kg, changing the charged amount of methanol to 2.91 kg, adding 0.075 kg of PPVE for every 1 kg of TFE supplied, and changing the polymerization time to 27 hours. The results are shown in Table 3.

Comparative Example 4

Non-fluorinated pellets were obtained as in Example 1, except for changing the charged amount of PPVE to 1.51 kg, changing the charged amount of methanol to 3.00 kg, adding 0.075 kg of PPVE for every 1 kg of TFE supplied, and changing the polymerization time to 27 hours. The results are shown in Table 3.

Comparative Example 5

51.8 L of pure water was charged in a 174 L-volume autoclave; nitrogen replacement was sufficiently carried out; thereafter, 40.9 kg of perfluorocyclobutane, 4.13 kg of perfluoro(propyl vinyl ether) (PPVE) and 2.76 kg of methanol were charged; and the temperature in the system was held at 35° C. and the stirring speed was held at 200 rpm. Then, tetrafluoroethylene (TFE) was introduced under pressure up to 0.64 MPa, and thereafter 0.051 kg of a 50% methanol solution of di-n-propyl peroxydicarbonate was charged to initiate polymerization. Since the pressure in the system decreased along with the progress of the polymerization, TFE was continuously supplied to make the pressure constant, and 0.082 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to thereby obtain 44.3 kg of a powder.

The obtained powder was melt extruded at 360° C. by a screw extruder (trade name: PCM46, manufactured by Ikegai Corp) to thereby obtain pellets of the TFE/PPVE copolymer. By using the obtained pellets, the PPVE content was measured by the above-mentioned method. The results are shown in Table 3.

The obtained pellets were put in the vacuum vibration-type reactor VVD-30 (manufactured by OKAWARA MFG. CO., LTD.), and heated to 160° C. After vacuumizing, $F_2$ gas diluted to 20% by volume with $N_2$ gas was introduced to the atmospheric pressure. 0.5 hour after the $F_2$ gas introduction, vacuumizing was once carried out and the $F_2$ gas was again introduced. Further, 0.5 hour thereafter, vacuumizing was again carried out and the $F_2$ gas was again introduced. Thereafter, while the above operation of the $F_2$ gas introduction and the vacuumizing was carried out once every 1 hour, the reaction was carried out at a temperature of 160° C. for 5 hours. After the reaction was finished, the reactor interior was replaced sufficiently by $N_2$ gas to finish the fluorination reaction. By using the fluorinated pellets, various physical properties were measured by the methods described above. The results are shown in Table 3.

TABLE 3

| | PPVE content (wt %) | MFR (g/10 min) | Number of functional groups (number/C$10^6$) | Melting point (° C.) |
|---|---|---|---|---|
| Example 1 | 6.0 | 50.0 | <6 | 302 |
| Example 2 | 6.2 | 53.0 | <6 | 301 |
| Example 3 | 6.4 | 55.0 | <6 | 300 |
| Example 4 | 6.6 | 58.0 | <6 | 299 |
| Example 5 | 6.9 | 61.0 | <6 | 297 |
| Example 6 | 7.0 | 67.5 | <6 | 296 |
| Example 7 | 7.1 | 64.0 | <6 | 296 |
| Example 8 | 6.8 | 56.0 | <6 | 298 |
| Example 9 | 7.6 | 50.0 | 44 | 293 |
| Comparative Example 1 | 5.4 | 65.1 | <6 | 302 |
| Comparative Example 2 | 5.5 | 61.0 | 28 | 302 |
| Comparative Example 3 | 7.0 | 72.8 | <6 | 296 |
| Comparative Example 4 | 7.0 | 67.5 | 373 | 296 |
| Comparative Example 5 | 7.6 | 40.0 | 45 | 293 |

The description of "<6" in Table 3 means that the number of functional groups is less than 6.

(Electric Wire Coating Property (2))

Extrusion coating in the following coating thickness was carried out on a copper conductor of 0.079 mm in conductor diameter by a 20-mmϕ electric wire coating forming machine (manufactured by MITSUBA MFG. CO., LTD.), to thereby obtain a coated electric wire.

The extrusion conditions for the electric wire coating were as follows.

a) Core conductor: mild steel wire conductor of 0.079 mm in conductor diameter (AWG40)
b) Coating thickness: 0.030 mm
c) Coated electric wire diameter: 0.14 mm
d) Electric wire take-over speed: 50 m/min
e) Extrusion condition:
   Cylinder screw diameter=20 mm, a single screw extruder of L/D=24
   Die (inner diameter)/tip (outer diameter)=2.2 mm/1.2 mm Set temperature of the extruder: barrel section C-1 (330° C.), barrel section C-2 (350° C.), barrel section C-3 (370° C.), neck section (370° C.), head section (370° C.), die section D (370° C.), Set temperature for preheating core wire: 150° C.

(2-1) Presence/Absence of the Coating Discontinuity

Electric wire coating forming was continuously carried out; and the case where coating discontinuity occurred once or more in 1 hour was determined as poor (Poor) in continuous forming, and the case where no coating discontinuity occurred was determined as fair (Good) in continuous forming.

(2-2) Number of Sparks

A spark tester (HF-15AC, manufactured by Clinton Instrument Company) was installed online on an electric wire coating line, and the presence/absence of defects of electric wire coating was evaluated at a voltage of 500 V. The case where no spark was generated in 1-hour continuous forming was determined as passing (Good), and the case where a spark was detected therein was determined as rejected (Poor).

(Electric Wire Coating Property (1))

Extrusion coating in the following coating thickness of the pellets was carried out on a copper conductor of 0.50 mm in conductor diameter by a 30-mmϕ electric wire coating forming machine (manufactured by Tanabe Plastics Machinery Co., Ltd.), to thereby obtain a coated electric wire.

The extrusion conditions for the electric wire coating were as follows.

a) Core conductor: mild steel wire conductor of 0.50 mm in conductor diameter
b) Coating thickness: 0.20 mm
c) Coated electric wire diameter: 0.9 mm
d) Electric wire take-over speed: 100 m/min
e) Extrusion condition:
   Cylinder screw diameter=30 mm, a single screw extruder of L/D=22
   Die (inner diameter)/tip (outer diameter)=9.0 mm/5.0 mm Set temperature of the extruder: barrel section C-1 (330° C.), barrel section C-2 (360° C.), barrel section C-3 (370° C.), head section H (380° C.), die section D-1 (380° C.), die section D-2 (380° C.), Set temperature for preheating core wire: 80° C.

The obtained coated electric wire was evaluated as follows.

(1-1) Crack Test (180° C.×96 Hours)

10 pieces of electric wire of 20 cm in length were cut out from the obtained coated electric wire, and used as electric wires for the crack test (test pieces). The test pieces were subjected to a heat treatment at 180° C. for 96 hours in a straight state thereof.

The test pieces were taken out and each wound on an electric wire having the same diameter as the test pieces to make specimens; and the specimens were again subjected to a heat treatment at 200° C. for 1 hour, and taken out and cooled at room temperature; thereafter, the electric wires were unwound and the number of the electric wires having a crack(s) generated was counted visually and by using a magnifying glass. The case where one piece of the electric wire had a crack(s) even at one spot was determined as having a crack. The case where the number of the electric wires confirmed to have a crack was 0 in 10 pieces thereof was ranked as Good; the case of 1, as Fair; and the case of 2 or more, as Poor.

(1-2) Crack Test (180° C.×24 Hours)

10 pieces of electric wire of 20 cm in length were cut out from the obtained coated electric wire, and used as electric wires for the crack test (test pieces). The test pieces were subjected to a heat treatment at 180° C. for 24 hours in a straight state thereof.

The test pieces were taken out and each wound on an electric wire having the same diameter as the test pieces to make specimens; and the specimens were again subjected to a heat treatment at 200° C. for 1 hour, and taken out and cooled at room temperature; thereafter, the electric wires were unwound and the number of the electric wires having a crack(s) generated was counted visually and by using a magnifying glass. The case where one piece of the electric wire had a crack(s) even at one spot was determined as having a crack. The case where the number of the electric wires confirmed to have a crack was 0 in the 10 pieces thereof was ranked as Good; the case of 1, as Fair; and the case of 2 or more, as Poor.

(1-3) Core Wire Corrosion Test

The coated electric wire formed by the above forming condition was cut out into a length of 20 cm, and was allowed to stand still in a thermohygrostatic chamber (Junior SD-01, manufactured by Formosa Advanced Technologies Co., Ltd.) at 60° C. and a humidity of 95% for 2 weeks, and thereafter, the coating layer was peeled off to bare the copper conductor; and the surface of the copper conductor was visually observed and the evaluation was made according to the following criteria.

Good: no corrosion was observed

Poor: corrosion was observed (Surface Smoothness)

The copolymer was injection molded by using an injection molding machine (SE50EV-A, manufactured by Sumitomo Heavy Industries, Ltd.) set at a cylinder temperature of 390° C., a metal mold temperature of 200° C. and 150 mm/s. The metal mold used was a metal mold (4 cavities of 50 mm×35 mm×0.5 mmt) Cr plated on HPM38. The surface of the obtained injection molded article was visually observed and the surface smoothness was evaluated according to the following criteria.

Very Good: the surface was smooth

Good: roughness was observed only on a surface of the portion positioned in the vicinity of the gate of the metal mold Poor: roughness was observed on the most portion of the surface (Dielectric Loss Tangent)

By melt forming the pellets, a cylindrical test piece of 2 mm in diameter was prepared. The prepared test piece was set in a cavity resonator for 6 GHz, manufactured by KANTO Electronic Application and Development Inc., and the dielectric loss tangent was measured by a network analyzer, manufactured by Agilent Technologies Inc. By analyzing the measurement result by analysis software "CPMA", manufactured by KANTO Electronic Application and Development Inc., on PC connected to the network analyzer, the dielectric loss tangent (tan δ) at 20° C. at 6 GHz was determined.

(Water Vapor Permeability)

By using the pellets and a heat press molding machine, a sheet-shape test piece of approximately 0.2 mm in thickness was prepared. 18 g of water was put in a test cup (permeation area: 12.56 $cm^2$), and the test cup was covered with the sheet-shape test piece; and a PTFE gasket was pinched and fastened to hermetically close the test cup. The sheet-shape test piece was brought into contact with the water, and held at a temperature of 95° C. for 30 days, and thereafter, the test cup was taken out and allowed to stand at room temperature for 2 hours; thereafter, the amount of the mass lost was measured. The water vapor permeability ($g\cdot cm/m^2$) was determined by the following formula.

Water vapor permeability ($g\cdot cm/m^2$)=the amount of the mass lost (g)×the thickness of the sheet-shape test piece (cm)/the permeation area ($m^2$)

(Electrolytic Solution Immersion Test)

Approximately 5 g of the pellets was charged in a metal mold (inner diameter: 120 mm, height: 38 mm), and melted by hot plate press at 370° C. for 20 min, thereafter, water-cooled with a pressure of 1 MPa (resin pressure) to thereby prepare a molded article of approximately 0.2 mm in thickness. Thereafter, by using the obtained molded article, test pieces of 15-mm square were prepared.

10 sheets of the obtained test pieces and 2 g of an electrolytic solution (dimethyl carbonate (DMC)) were put in a 20-mL glass sample bottle, and the cap of the sample bottle was closed. The sample bottle was put in a thermostatic chamber at 80° C., and allowed to stand for 144 hours to thereby immerse the test pieces in the electrolytic solution. Thereafter, the sample bottle was taken out from the thermostatic chamber, and cooled to room temperature; then, the test pieces were taken out from the sample bottle.

The electrolytic solution remaining after the test pieces were taken out was allowed to be air-dried in the sample bottle put in a room controlled to be a temperature of 25° C. for 24 hours; and 2 g of ultrapure water was added. The obtained aqueous solution was transferred to a measuring cell of an ion chromatosystem; and the amount of fluorine ions in the aqueous solution was measured by an ion chromatograph system (manufactured by Thermo Fisher Scientific Inc., Dionex ICS-2100).

(Metal Mold Corrosion Test)

20 g of the pellets was put in a glass container (50-ml screw vial); and a metal post (5-mm square shape, length of 30 mm) formed of HPM38 (Cr-plated) or HPM38 (Ni-plated) was hung in the glass container so as not to be in contact with the pellets. Then, the glass container was covered with a lid made of an aluminum foil. The glass container was put in an oven as is and heated at 380° C. for 3 hours. Thereafter, the heated glass container was taken out from the oven, and cooled to room temperature; and the degree of corrosion of the surface of the metal post was visually observed. The degree of corrosion was judged based on the following criteria.

Good: no corrosion observed.

Fair: corrosion slightly observed

Poor: corrosion observed.

(Abrasion Test)

By using the pellets and a heat press molding machine, a sheet-shape test piece of approximately 0.2 mm in thickness was prepared and cut out into a test piece of 10 cm×10 cm. The prepared test piece was fixed on a test bench of a Taber abrasion tester (No. 101-H Taber type abrasion tester with an option, manufactured by YASUDA SEIKI SEISAKUSHO, LTD.) and the abrasion test was carried out under the conditions of at a load of 500 g, using an abrasion wheel CS-10 (rotationally polished in 20 rotations with an abrasive paper #240) and at a rotation rate of 60 rpm by using the Taber abrasion tester. The weight of the test piece after 1,000 rotations was measured, and the same test piece was further subjected to the test of 10,000 rotations and thereafter, the weight thereof was measured. The abrasion loss was determined by the following formula.

$$\text{Abrasion loss (mg)} = M1 - M2$$

M1: the weight of the test piece after the 1,000 rotations (mg)

M2: the weight of the test piece after the 10,000 rotations (mg)

(Electrolytic Solution Permeability)

By using the pellets and a heat press molding machine, a sheet-shape test piece of approximately 0.2 mm in thickness was prepared. 10 g of dimethyl carbonate (DMC) was put in a test cup (permeation area: 12.56 $cm^2$), and the test cup was covered with the sheet-shape test piece; and a PTFE gasket was pinched and fastened to hermetically close the test cup. The sheet-shape test piece was brought into contact with the DMC, and held at a temperature of 60° C. for 30 days, and thereafter, the test cup was taken out and allowed to stand at room temperature for 1 hour; thereafter, the amount of the mass lost was measured. The DMC permeability ($g \cdot cm/m^2$) was determined by the following formula.

$$\text{Electrolytic solution permeability } (g \cdot cm/m^2) = \text{the amount of the mass lost (g)} \times \text{the thickness of the sheet-shape test piece (cm)} / \text{the permeation area } (m^2)$$

(Chemical Immersion Crack Test (Heat Distortion Resistance after Immersion in an Electrolytic Solution))

A sheet of approximately 2 mm in thickness was prepared by using the pellets and a heat press molding machine. The obtained sheet was punched out by using a rectangular dumbbell of 13.5 mm×38 mm to obtain 3 test pieces. A notch was formed on the middle of a long side of the each obtained test piece according to ASTM D1693 by a blade of 19 mm×0.45 mm. Three notched test pieces and 25 g of dimethyl carbonate were put in a 100-mL polypropylene-made bottle, and heated in an electric furnace at 80° C. for 20 hours; and thereafter, the notched test pieces were taken out. Then, the three notched test pieces were mounted on a stress crack test jig according to ASTM D1693, and heated in an electric furnace at 80° C. for 2 hours; thereafter, the notches and their vicinities were visually observed and the number of cracks was counted. A sheet having no crack generated is excellent in the heat distortion resistance even after immersion in the electrolytic solution.

Good: the number of cracks was 0

Poor: the number of cracks was 1 or more

TABLE 4

| | Electric wire coating property (2) | | Electric wire coating property (1) | | | | |
|---|---|---|---|---|---|---|---|
| | Coating discontinuity | Spark evaluation | Crack 180° C. × 24 hrs | Crack 180° C. × 96 hrs | Surface smoothness | Dielectric loss tangent | Water vapor permeability (g · cm/m²) |
| Example 1 | Good | Good | Good | Good | Good | 0.00037 | 10.6 |
| Example 2 | Good | Good | Good | Good | Very Good | 0.00037 | 10.7 |
| Example 3 | Good | Good | Good | Good | Very Good | 0.00037 | 10.8 |
| Example 4 | Good | Good | Good | Good | Very Good | 0.00038 | 11.0 |
| Example 5 | Good | Good | Good | Good | Very Good | 0.00038 | 11.3 |
| Example 6 | Good | Good | Good | Fair | Very Good | 0.00038 | 11.2 |
| Example 7 | Good | Good | Good | Good | Very Good | 0.00038 | 11.4 |
| Example 8 | Good | Good | Good | Good | Very Good | 0.00038 | 11.5 |
| Example 9 | Good | Good | Good | Good | Good | 0.00050 | 12.7 |
| Comparative Example 1 | Good | Good | Poor | Poor | Very Good | 0.00035 | 9.0 |
| Comparative Example 2 | Good | Good | Poor | Poor | Very Good | 0.00042 | 9.7 |

TABLE 4-continued

| | | | | | | | |
|---|---|---|---|---|---|---|---|
| Comparative Example 3 | Good | Good | Fair | Poor | Very Good | 0.00038 | 11.0 |
| Comparative Example 4 | Good | Poor | Fair | Poor | Very Good | 0.00124 | 11.2 |
| Comparative Example 5 | Poor | Poor | Good | Good | Poor | 0.00050 | 13.3 |

| | Electrolytic solution immersion test Amount of fluorine ions dissolving out (ppm) | Electric wire coating property (1) Core wire corrosion test | Metal mold corrosion test HPM36 (Cr plated) | HPM38 (Ni plated) | Abrasion loss (mg) | Electrolytic solution permeability (g · cm/m$^2$) | Heat distortion resistance After immersion in electrolytic solution |
|---|---|---|---|---|---|---|---|
| Example 1 | 0.7 | Good | Good | Good | 27.9 | 6.2 | Good |
| Example 2 | 0.7 | Good | Good | Good | 28.2 | 6.1 | Good |
| Example 3 | 0.7 | Good | Good | Good | 27.8 | 6.2 | Good |
| Example 4 | 0.7 | Good | Good | Good | 27.7 | 6.2 | Good |
| Example 5 | 0.7 | Good | Good | Good | 27.0 | 6.2 | Good |
| Example 6 | 0.7 | Good | Good | Good | 28.3 | 6.2 | Good |
| Example 7 | 0.7 | Good | Good | Good | 26.9 | 6.2 | Good |
| Example 8 | 0.7 | Good | Good | Good | 26.0 | 6.3 | Good |
| Example 9 | 0.8 | Good | Good | Good | 20.7 | 6.8 | Good |
| Comparative Example 1 | 0.7 | Good | Good | Good | 35.6 | 5.8 | Poor |
| Comparative Example 2 | 0.7 | Good | Good | Good | 33.8 | 5.9 | Poor |
| Comparative Example 3 | 0.7 | Good | Good | Good | 30.1 | 6.1 | Good |
| Comparative Example 4 | 1.7 | Poor | Poor | Poor | 28.3 | 7.2 | Good |
| Comparative Example 5 | 0.8 | Good | Good | Good | 17.3 | 7.0 | Good |

What is claimed is:

1. A copolymer, comprising tetrafluoroethylene unit and a perfluoro(propyl vinyl ether) unit, wherein the copolymer has a content of the perfluoro (propyl vinyl ether) unit of 5.8 to 7.6% by mass with respect to the whole of the monomer units, and a melt flow rate of 50 to 67.5 g/10 min, and a total number of functional groups of $—CF{=}CF_2$, $—CF_2H$, —COF, —COOH, $—COOCH_3$, $—CONH_2$ and $—CH_2OH$ is 50 or less per $10^6$ main-chain carbon atoms.

2. An injection molded article, comprising the copolymer according to claim 1.

3. A member to be compressed, comprising the copolymer according to claim 1.

4. A coated electric wire, comprising a coating layer comprising the copolymer according to claim 1.

* * * * *